March 2, 1926.
S. SCHIFF
AUTOMATIC PROOFER
Filed Jan. 21, 1921
1,575,282
6 Sheets-Sheet 1
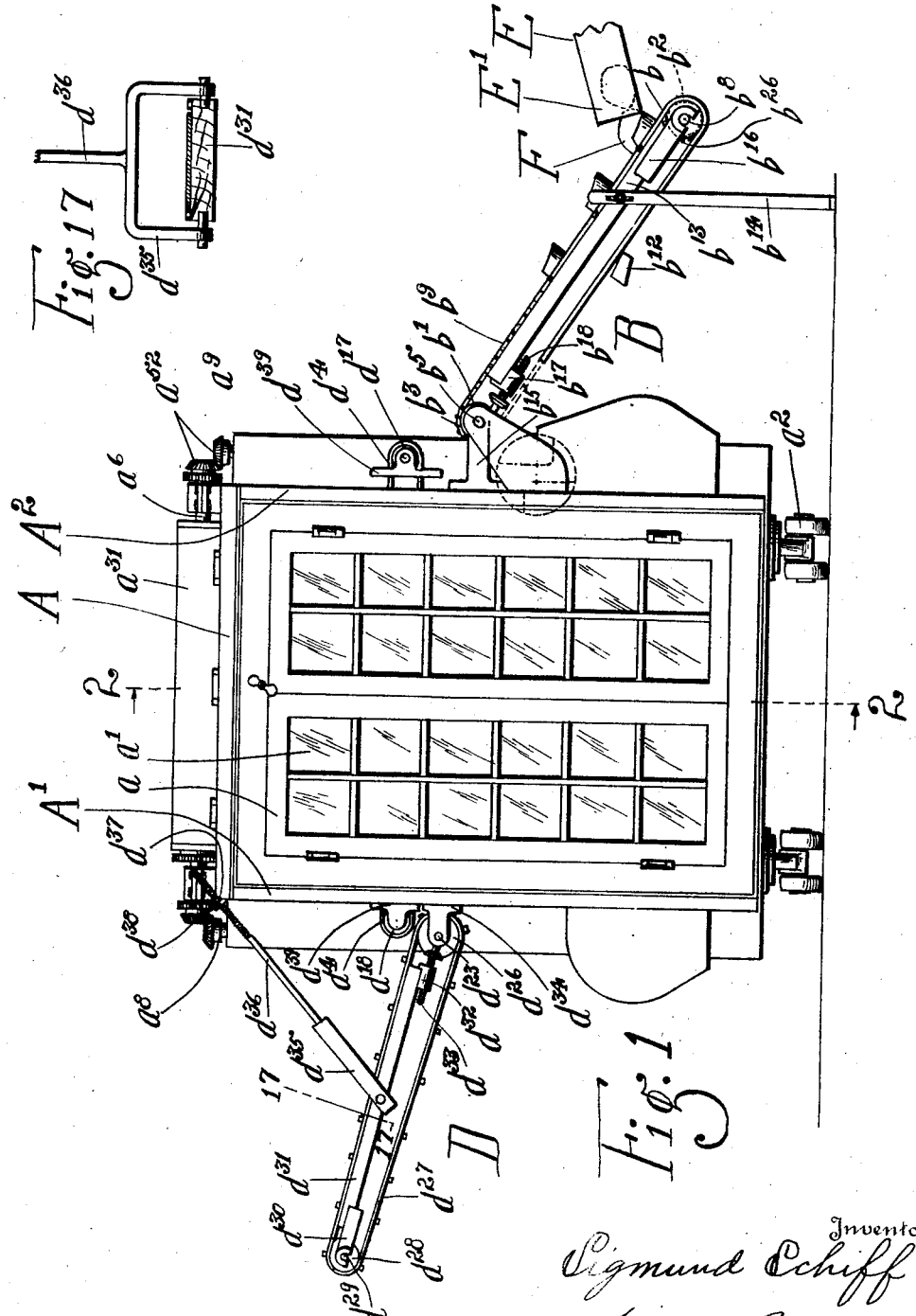
Inventor
Sigmund Schiff
By Walter F. Murray
Attorney

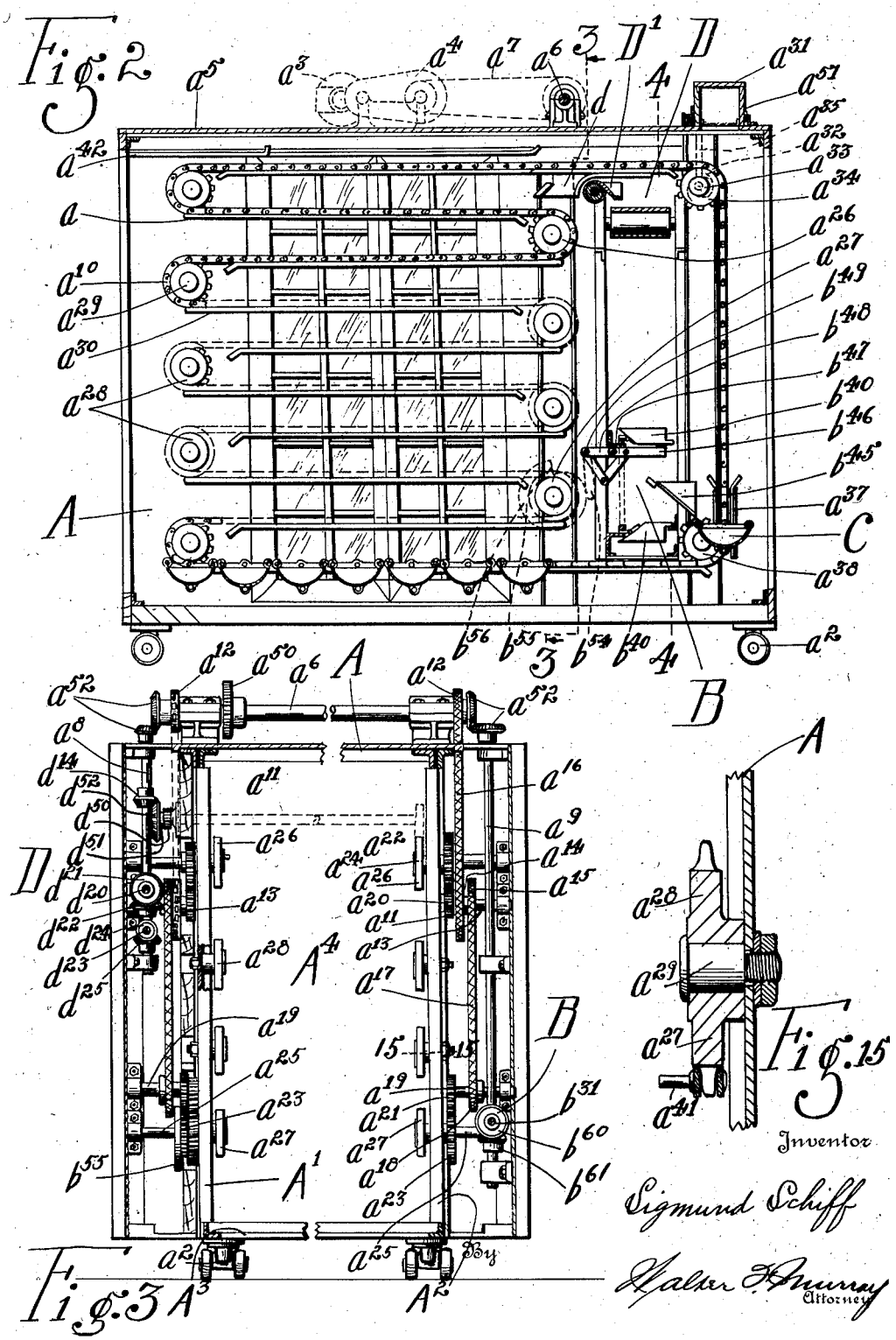

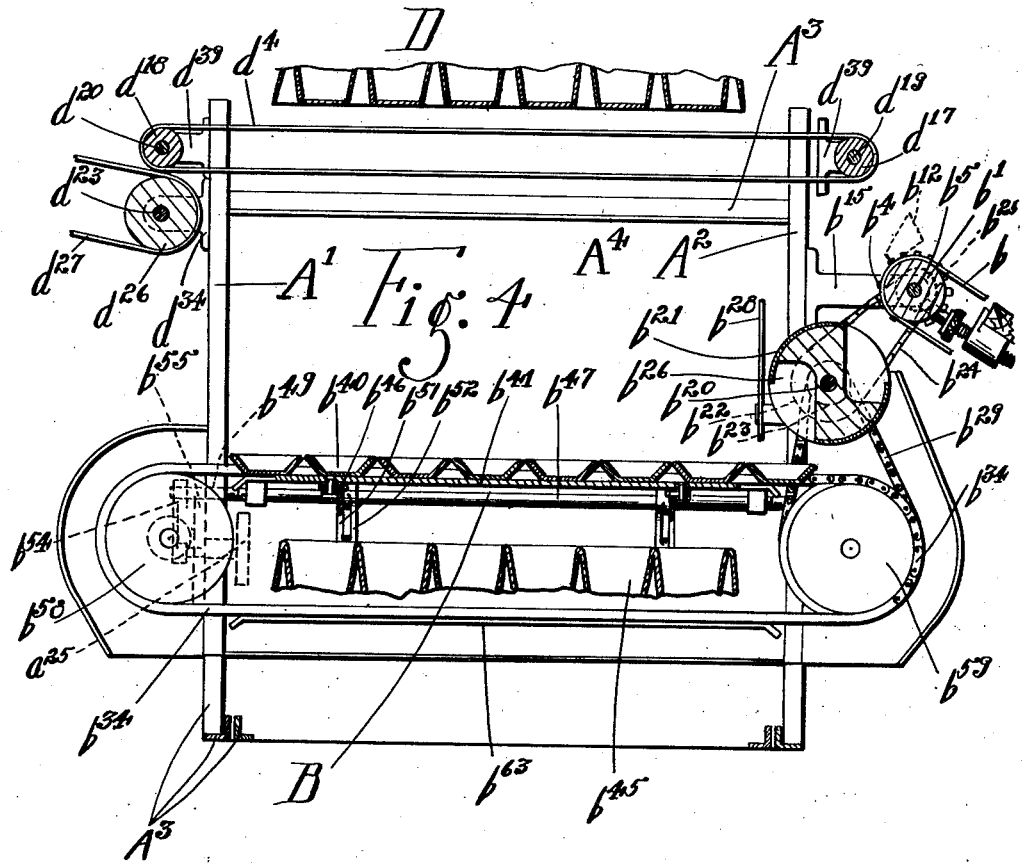
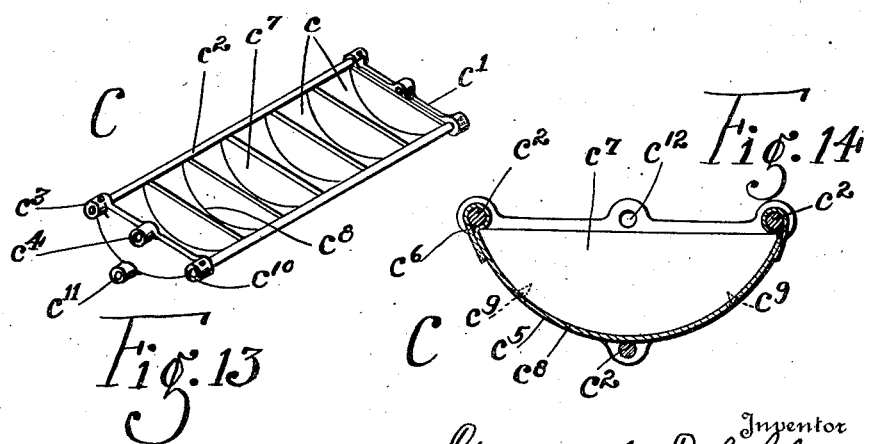

March 2, 1926. 1,575,282
S. SCHIFF
AUTOMATIC PROOFER
Filed Jan. 21, 1921 6 Sheets-Sheet 4
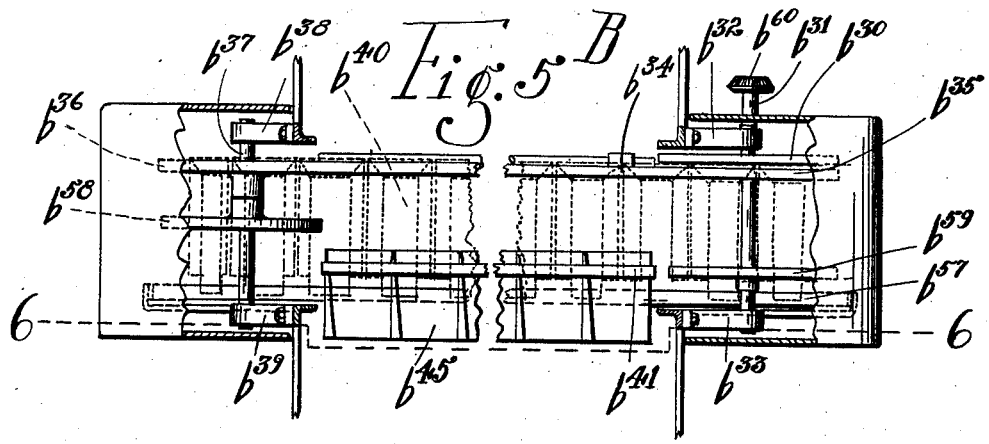
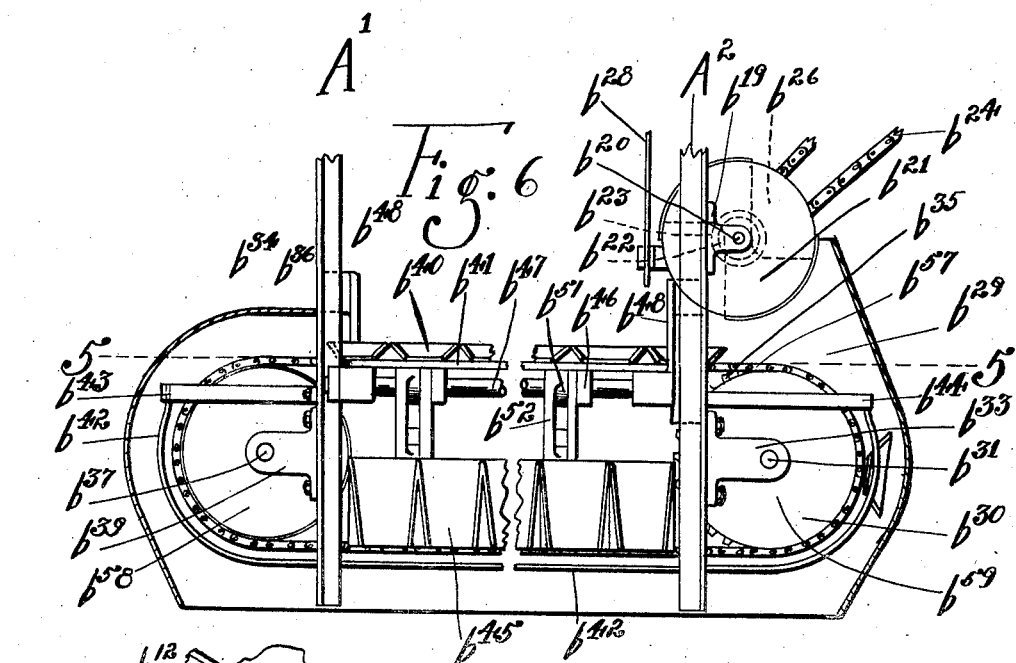
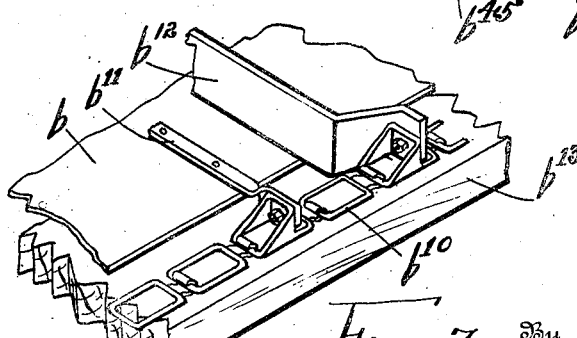
Inventor
Sigmund Schiff
By Walter F. Murray
Attorney

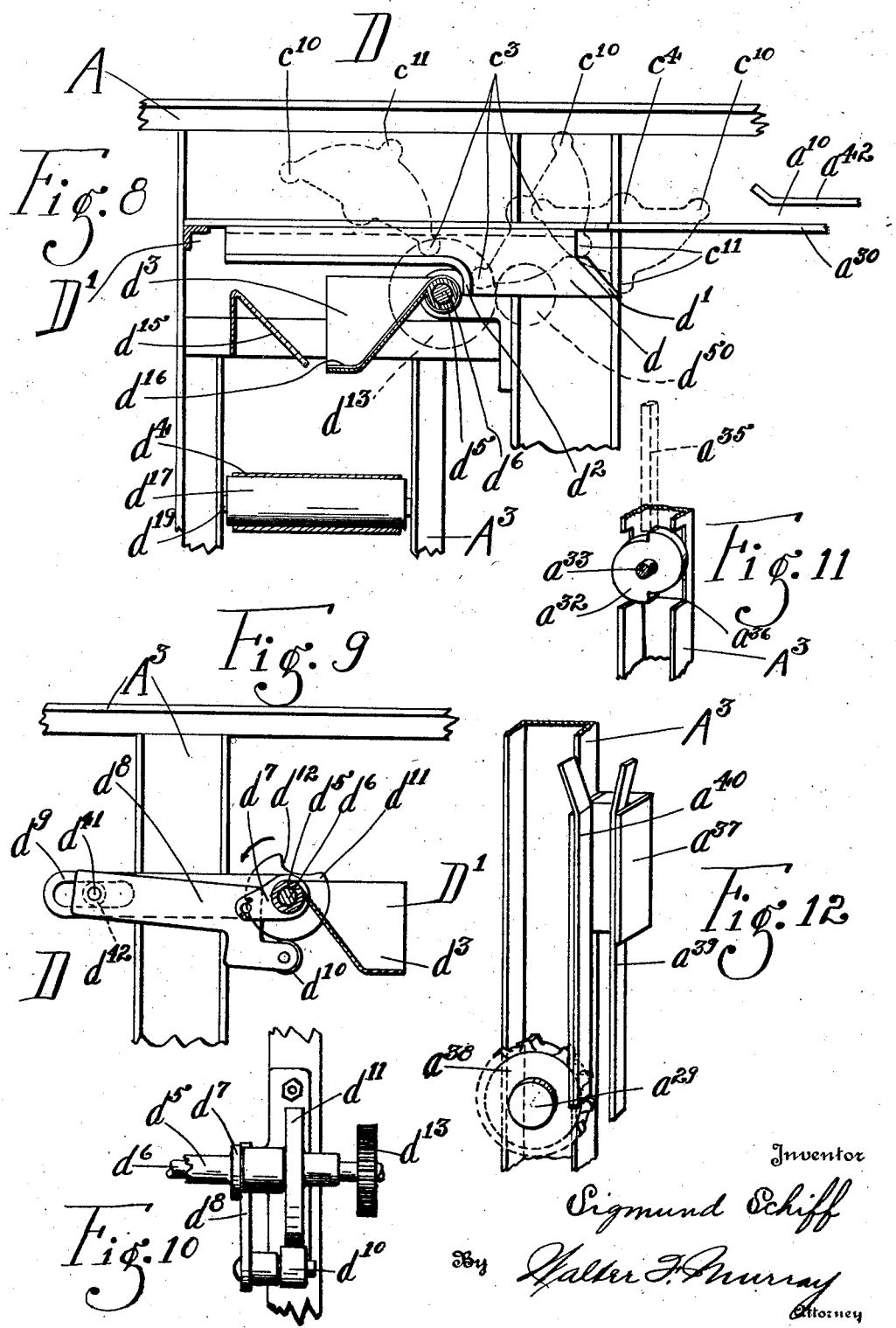

March 2, 1926.  
S. SCHIFF  
1,575,282  
AUTOMATIC PROOFER  
Filed Jan. 21, 1921  
6 Sheets-Sheet 6

Inventor  
Sigmund Schiff  
By Walter F. Murray  
Attorney

Patented Mar. 2, 1926.

1,575,282

UNITED STATES PATENT OFFICE.

SIGMUND SCHIFF, OF CINCINNATI, OHIO.

AUTOMATIC PROOFER.

Application filed January 21, 1921. Serial No. 439,015.

*To all whom it may concern:*

Be it known that I, SIGMUND SCHIFF, a citizen of the United States of America, and resident of Cincinnati, in the county of Hamilton and State of Ohio, have invented a new and useful Improvement in an Automatic Proofer, of which the following is a specification.

An object of my invention is to provide an efficient and compact tray proofer.

Another object is to provide a device wherein there can be no possible congestion whereby several lumps of dough will be placed in such relation that they can unite and form large masses of dough.

Another object is to provide a proofer in which no artificial heat is necessary, the proofer being adapted to conserve the heat generated by the fermentation within the dough which is sufficient to provide the necessary heat to assure the proper temperature for the operation thereof.

Another object is to provide a proofer that will require a relatively small space in proportion to its capacity for work.

Another object is to provide a device in the class referred to in which the possibility of breaking the skin of the individual lumps of dough will be reduced to a minimum.

Another object is to provide a device that may be readily moved about, and in which ready access is had to all parts of the device at all times.

These and other objects are attained by the means described herein and disclosed in the accompanying drawings in which:

Fig. 1 is a front elevation of a device embodying my invention.

Fig. 2 is a sectional view on line 2—2 of Fig. 1.

Fig. 3 is a sectional view on line 3—3 of Fig. 2.

Fig. 4 is an enlarged fragmental view on line 4—4 of Fig. 2.

Fig. 5 is an enlarged sectional view on line 5—5 of Fig. 6.

Fig. 6 is a sectional view on line 6—6 of Fig. 5.

Fig. 7 is an enlarged fragmental view of part of the intake mechanism forming a detail of my invention.

Fig. 8 is an enlarged diagrammatical view of part of the discharge mechanism forming a detail of my invention.

Fig. 9 is an enlarged sectional view of part of the discharge mechanism forming a detail of my invention.

Fig. 10 is an enlarged front elevation of the parts shown in Fig. 9.

Fig. 11 is an enlarged fragmental perspective of a flour sieve actuating device forming a detail of my invention.

Fig. 12 is an enlarged perspective view of a tray guide forming a detail of my invention.

Fig. 13 is an enlarged perspective of a tray forming a detail of my invention.

Fig. 14 is an enlarged sectional view taken on a transverse line thru Fig. 13.

Fig. 15 is an enlarged sectional view on line 15—15 of Fig. 3.

Fig. 17 is an enlarged sectional view on line 17—17 of Fig. 1.

Figure 16:
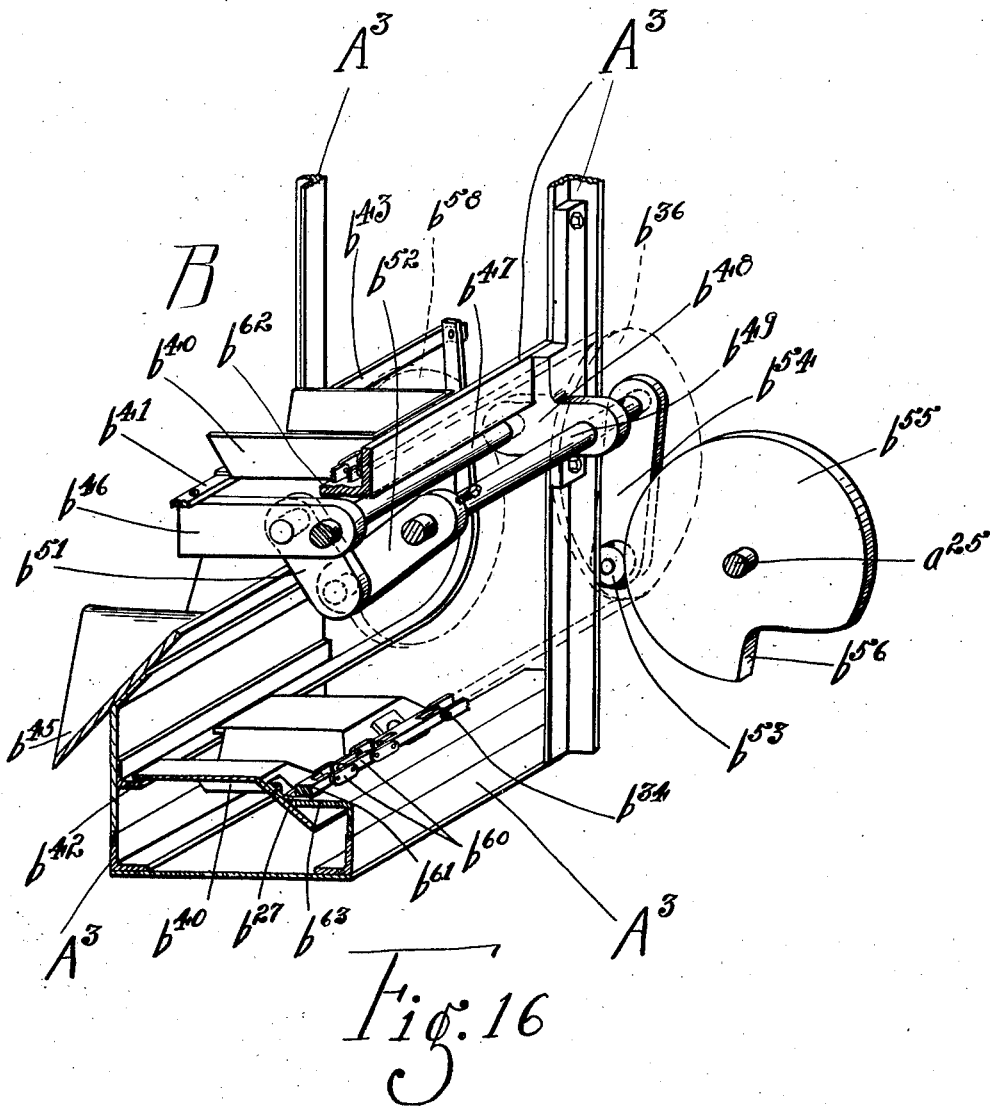
Fig. 16 is an enlarged perspective of part of the loading device.

My invention comprises a proving case A within which are disposed a series of trays that are supported between endless chains and are moved thru such case, carrying the dough during the proving period. The loading device B extends partly within and without the casing A, and is adapted to deposit individual lumps F of dough in individual compartments of the trays within the casing. The discharge device D extends partly within and partly without the casing, and is adapted to empty the trays and to carry the individual lumps of dough out of the casing A, and to discharge the individual lumps of dough separately and singly into any suitable device that is to then work upon the dough, which ordinarily is the moulder.

The proofer casing A is preferably of a rectangular construction and has side frames A' and A². The frames are formed primarily of angle irons and channel irons and are secured upon one another by means of angle and channel irons A³ extending between the frames. The spaces between the angle irons and channel irons are enclosed by any suitable material such as wood, so as to provide the enclosed casing A⁴. A series of doors $a$ are mounted upon the sides and ends of the chamber. These doors have glass panels $a'$ mounted in them. The chamber formed interiorly of the casing comprises a proofing chamber A⁴. The casing is preferably made with a central opening in its bottom, and is supported upon casters or rollers $a^2$ whereby the device may be readily moved from place to place. Suitable driving means, see Figs. 2 and 3, such as a motor $a^3$ and speed change mechanisms such as $a^4$ may be mounted on the top $a^5$ of the case, or any other means of power may be employed to impart rotatory motion to the transverse shaft $a^6$ mounted upon the top of the casing. I have illustrated a motor and change speed device mounted on the casing adapted to impart motion to the shaft $a^6$ by means of the chain $a^7$ engaging the sprocket wheel $a^{50}$ mounted on shaft $a^6$. The shaft $a^6$ is adapted to drive by means of bevel gears $a^{52}$, the vertical shafts $a^8$ and $a^9$, see Fig. 3, mounted upon the sides of the casing and transmitting power to a discharge device D and the loading device B respectively. The shaft $a^6$ drives the endless chains $a^{10}$ which in turn drive the endless chains $a^{10}$ between which the trays C are disposed. The chains $a^{10}$ are part of the driving mechanisms $a^{11}$. The driving mechanisms $a^{11}$ comprise the sprocket wheels $a^{12}$ mounted upon shaft $a^6$, the parallel horizontal shafts $a^{13}$ and $a^{19}$, the sprocket wheels $a^{14}$ and $a^{15}$ mounted on shaft $a^{13}$, the sprocket wheel $a^{18}$ mounted on shaft $a^{19}$, an endless chain $a^{16}$ extending about sprocket wheels $a^{12}$ and $a^{14}$, and an endless chain $a^{17}$ extending about sprocket wheels $a^{15}$ and $a^{18}$. Mounted upon shafts $a^{13}$ and $a^{19}$ are gears $a^{20}$ and $a^{21}$ respectively, engaging gears $a^{22}$ and $a^{23}$ respectively mounted upon stud shafts $a^{24}$ and $a^{25}$ respectively. Mounted upon the interior ends of the shafts $a^{24}$ and $a^{25}$ are the sprocket wheels $a^{26}$ and $a^{27}$ respectively, the sprocket wheels $a^{26}$ and $a^{27}$ engaging and driving the chains $a^{10}$. The chains $a^{10}$ pass around a series of sprocket wheels $a^{28}$ disposed interiorly to the casing, and mounted upon individual stud shafts $a^{29}$ mounted upon the casing A. This construction eliminates the transverse shafts that would otherwise extend thru the casing and require considerable enlargement of the sprocket wheels to permit free movement of the trays about such transverse shafts. The sprocket wheels are mounted upon the sides of the casing in staggered relation and the wheels on one side of the casing being directly opposed to those on the opposite side of the casing. A series of chain supports $a^{30}$ extend between the sprocket wheels and support the chains in a horizontal plane as they pass from one sprocket wheel to the sprocket wheel next above. These chain supports also support the trays, because the trays are mounted between the chains $a^{10}$ one of which is disposed upon each side of the casing. The loading and discharge devices are disposed near the forward end of the casing and at which end of the casing the endless chains $a^{10}$ carrying the trays, are brought from the top of the casing to the bottom thereof, by the chains moving vertically downward from the top to the bottom of the proofing chamber. As the trays begin their downward movement at the forward end of the casing they are immediately below the flour box $a^{31}$ mounted on the top of the case, the flour box having a sieve in its bottom. The box is actuated in such manner that flour contained within the box is distributed over the interior of the tray C at such time. This is accomplished by means of a cam $a^{32}$ (see Fig. 11) mounted upon stud shaft $a^{33}$ upon which the sprocket wheel $a^{34}$ is mounted. A rod $a^{35}$ reciprocally mounted upon the casing has its lower end in engagement with the cam $a^{32}$, and as the cam is revolved the rod $a^{35}$ is moved upward. The upper end of the rod engages the box $a^{31}$. Box $a^{31}$ is hingedly mounted upon the top $a^5$ by means of hinges $a^{51}$ and when the rod $a^{35}$ reaches the edge of tooth $a^{36}$ on the periphery of the cam $a^{32}$, the rod $a^{35}$ and the box $a^{31}$ fall. When the rod $a^{35}$ then engages the cam $a^{32}$, the impact causes some of the flour in the box $a^{31}$ to pass thru the sieve and fall into the tray C immediately below the sieve. The cam actuates the rod in such wise that flour will be sprinkled into each tray as it is moved immediately below the sieve. After the chains $a^{10}$ pass about the sprocket wheels $a^{34}$ they pass downward thru a guide $a^{37}$, see Fig. 12, to and about a sprocket wheel $a^{38}$. The guides $a^{37}$ comprise two parallel vertical rods $a^{39}$ and $a^{40}$ having outwardly projecting arms at their upper ends. The rod $a^{40}$ extends slightly below the axis of the stud shaft supporting the sprocket wheel $a^{38}$, and rod $a^{39}$ preferably extends somewhat lower than the rod $a^{40}$. The purpose of the guide is to prevent lateral movement of the trays while being loaded and will be more fully explained hereafter.

The loading mechanism B comprises an endless belt $b$ mounted upon the rollers $b'$ and $b^2$. The sprocket wheels $b^3$, $b^4$ and $b^{25}$ are mounted upon the shaft $b^5$, supported by brackets $b^{15}$ mounted on the casing and supporting the roller $b'$. The roller $b'$ is disposed between the sprocket wheels $b^3$ and $b^4$. In like manner the sprocket wheels $b^6$ and $b^7$ (not shown) are mounted upon the shaft $b^8$ mounted on the support $b^{13}$ and supporting the roller $b^2$. The endless chains $b^9$ and $b^{10}$ extend between the sprocket wheels $b^3$ and $b^6$ and sprocket wheels $b^4$ and $b^7$ respectively. A cross bar $b^{11}$ (see Fig. 7) is mounted upon one of the links of each of the endless chains $b^9$ and $b^{10}$, and is attached to the belt $b$. A series of cups $b^{12}$ are attached to links of the chains $b^9$ and $b^{10}$ and extend over and upon the belt $b$. A support $b^{13}$ is mounted between the rollers $b'$ and $b^2$ and engages the under surface of the upper section of the belt $b$ and the endless chains $b^9$ and $b^{10}$. Suitable struts $b^{14}$ support the outermost end of the support $b^{13}$. The support $b^{13}$ has a yoke $b^{16}$ upon its lower and outermost end, the yoke supporting the shaft $b^8$. The support $b^{13}$ is adjustable longitudinally between the rollers $b'$ and $b^2$ by means of a threaded block $b^{17}$ mounted upon the upper end of the support and thru which an adjustable screw $b^{18}$ extends. The screw $b^{18}$ abuts the brackets $b^{15}$. By means of the described elements it is possible to increase or decrease the tension of the belt $b$ and the chains $b^9$ and $b^{10}$. The shaft $b^5$ is driven from shaft $b^{20}$ by chain $b^{24}$ engaging sprocket wheels $b^{22}$ and $b^{25}$. Immediately below the brackets $b^{15}$, are the brackets $b^{19}$ (see Fig. 6) supporting the shaft $b^{20}$ upon which a distributor drum $b^{21}$ is mounted. The sprocket wheels $b^{22}$ and $b^{23}$ are mounted upon the shaft $b^{20}$. The drum $b^{21}$ has pockets $b^{26}$ that pass beneath the belt $b$ and cups $b^{12}$. A vertical guide plate $b^{28}$ is disposed within the casing immediately adjacent the drum $b^{21}$. An endless chain $b^{29}$ extends about the sprocket wheel $b^{23}$ and about sprocket wheel $b^{30}$ (see Fig. 5) mounted upon the shaft $b^{31}$ supported by the brackets $b^{32}$ and $b^{33}$ mounted upon the frame A below the brackets $b^{19}$. The shaft $b^{31}$ has mounted on it the bevel gear $b^{60}$ engaging bevel gear $b^{61}$ mounted on vertical shaft $a^9$. An endless chain $b^{34}$ extends transversely of the casing, and is mounted on and extends around the sprocket wheel $b^{35}$ mounted upon the shaft $b^{31}$ adjacent the sprocket wheel $b^{30}$, and about the sprocket wheel $b^{36}$ mounted upon the shaft $b^{37}$ supported by the brackets $b^{38}$ and $b^{39}$ mounted upon the opposite frame of the casing. Shafts $b^{31}$ and $b^{37}$ are parallel and are mounted on opposite sides of the casing. The chain support $b^{62}$ (see Fig. 16) supports the chain $b^{34}$ as it passes from the sprocket wheel $b^{36}$ to sprocket wheel $b^{35}$ and chain support $b^{63}$ supports the same chain as it passes from sprocket wheel $b^{35}$ to sprocket wheel $b^{36}$. The chain $b^{34}$ comprises a series of links $b^{60}$ and a series of block links $b^{61}$, and the block links have pivotally attached to them the carriers $b^{40}$. The bottoms of these carriers are at their rear ends secured upon the chain $b^{34}$ by the hinges $b^{27}$. The forward ends of the carriers are in their upright positions, normally held up or supported by a reciprocating bar $b^{41}$ that is adapted to be vertically reciprocated. A fixed bar $b^{42}$ is mounted upon the brackets $b^{43}$ and $b^{44}$ in such manner and position that the carriers will be held in a relatively fixed position in relation to the chain $b^{34}$ as they move along their course when in other than an upright or normal position immediately above the bars $b^{41}$ and $b^{57}$. The disk $b^{59}$ holds the carriers upon the fixed bar $b^{42}$ as the chain $b^{34}$ moves around the sprocket wheel $b^{35}$, serving to move the carriers to the place where they engage the support rod $b^{57}$. As the carriers $b^{40}$ are moved in their cycle they pass beneath the drum $b^{21}$. When certain carriers reach certain determined places in their cycle and are disposed above a series of chutes $b^{45}$ the bar $b^{41}$ is moved downward by means of a suitable mechanism whereby the carriers are inclined and any dough that has been deposited in the carriers falls from the carriers into the chutes. The means whereby the bar $b^{41}$ is moved downward comprises a reciprocating bracket $b^{46}$ supporting the bar $b^{41}$, and mounted upon the transverse shaft $b^{47}$ mounted on supports $b^{48}$ mounted on opposite sides of the proofer casing. A second transverse shaft $b^{49}$ is mounted pivotally on the supports $b^{48}$, parallel to shaft $b^{47}$. A lever arm $b^{52}$ is mounted upon the shaft $b^{49}$. A link $b^{51}$ is pivotally attached to the arm $b^{52}$ and the bracket $b^{46}$. A roller $b^{53}$ is mounted upon the roller arm $b^{54}$ mounted on the shaft $b^{49}$ and engages the cam $b^{55}$ mounted upon one of the shafts $a^{25}$ adjacent the gear $a^{23}$ thereon. A notch $b^{56}$ is formed in the periphery of the cam $b^{55}$, and the entry of the roller $b^{53}$ into this notch causes the bar $b^{41}$ to be lowered and when the roller is moved out of the notch the bar $b^{41}$ is raised. The support rod $b^{57}$ extends horizontally in alignment with the rod $b^{41}$ and is disposed below the drum $b^{21}$. The disk $b^{59}$ carries the carriers to the support rod $b^{57}$ and is adapted to support the carriers as they move toward the bar $b^{41}$ after leaving the bar $b^{42}$. The disc $b^{58}$ mounted upon the shaft $b^{37}$ is adapted to support the carriers as they leave the bar $b^{41}$ and move toward the bar $b^{42}$. The disc $b^{58}$ has an added function in that after the bar $b^{41}$ has lowered the carriers, the tilted carrier closest to the disc $b^{58}$ is elevated to its normal or horizontal position by means of its engagement with the disc $b^{58}$, thereby avoiding any jamming of the carriers due to their continuous motion. The chutes $b^{45}$ extend at their upper end to such place that when the rod $b^{41}$ is lowered, some of the individual carriers register with individual chutes and the lower-most portion of the carriers, when in this tilted position, will be immediately above the upper-most portion of the chutes, the lowermost portion of the chutes terminating immediately adjacent the line of movement of the trays as they approach the sprocket wheel $a^{38}$. The trays are preferably divided into a series of compartments $c$ and the individual chutes register with these compartments $c$. As the trays approach the lower end of the chutes $b^{45}$ they are supported by the guide $a^{37}$, which will be more fully explained hereafter.

The mechanisms are so timed that a tray will be immediately below the chutes when the bar $b^{41}$ is lowered by means of the before described mechanisms, whereby the individual lumps of the dough in the individual carriers slide thru the individual chutes into individual compartments of the trays.

The trays C comprise end members $c'$ between which are secured the cross bars $c^2$. A series of lugs $c^3$, $c^4$, $c^{10}$, and $c^{11}$, extend outwardly beyond the end member $c'$. There are three cross members $c^2$, one at each side of the top of the trays and one at the bottom of the tray. The ends of the cross members are seated in the lugs $c^3$, $c^{10}$ and $c^{11}$, consequently the lugs $c^3$ and $c^{10}$ are disposed at opposite sides of the top of the end members and lug $c^{11}$ at the bottom of the end member. The support lug $c^4$ is formed mid-way between the two uppermost lugs $c^3$, $c^{10}$ and has a central bore $c^{12}$ into which extend the pins $a^{41}$ projecting from the chains $a^{10}$. The lug $c^4$ and the lowermost lug $c^{11}$ are normally in vertical alignment. The lugs $c^3$, $c^4$ and $c^{10}$ are normally in horizontal alignment. The bottom $c^5$ of the tray is preferably made of canvas and has the loops $c^6$ formed along its side edges thru which loops the cross bars $c^2$ extend. A series of partitions $c^7$ divide the tray into a series of compartments $c$. These partitions are preferably wedge shaped, being narrower at their top and wider at their bottom. The upper and outer ends of the partitions engage below the uppermost cross bars $c^2$, and span the canvas along their lower and rounded edge $c^8$. Suitable means such as tacks $c^9$ are employed to secure the partitions in place and cooperate with the tension due to the seating of the partitions as described, in positioning the partitions at determined places thruout the length of the tray. As the trays C approach the sprocket wheel $a^{38}$ the lugs $c^4$ and $c^{11}$ enter between the arms $a^{39}$ and $a^{40}$ of the tray guide $a^{37}$, whereby any lateral pivotal movement of the trays upon the pins $a^{41}$ is prevented, wherefore when the dough passing thru the chutes $b^{45}$ falls into the compartments $c$ of the tray, the tray cannot swing upon the pins $a^{41}$. After the dough has been deposited in the compartments of the tray, the tray moves about the sprocket wheel $a^{38}$ and at this stage reaches its lowest level. The chains $a^{10}$, after leaving sprocket wheels $a^{38}$ engage and ride upon the lowermost chain supports $a^{30}$ and move toward the rear of casing A, carrying the tray. The tray is moved backward and forward in successive horizontal planes thru the casing A by means of the chains $a^{10}$ passing over the series of sprocket wheels and being supported by the series of support members $a^{30}$, as it is moved from one sprocket wheel to the next. When the tray has reached the uppermost supporting member $a^{30}$ it moves forward toward the discharge mechanism D. See Figs. 8, 9 and 10. In order to assure the tray assuming a normal position when it reaches the discharge mechanism, a leveling bar $a^{42}$ is mounted on the side of the casing immediately above the uppermost section of the chain $a^{10}$. This bar extends toward the center of the casing to such extent that it will project over the lugs on the trays and assures the lugs $c^3$, $c^4$ and $c^{10}$ being in horizontal alignment as the tray moves over the uppermost support $a^{30}$.

The discharge device D embraces a cam $d$ adapted to tilt and invert the tray C so that the dough will pass from the tray to a belt that carries the dough out of the casing. The cam $d$ has an inclined and outwardly projecting tilting lug $d'$ that is engaged by the lowermost lug $c^{11}$ of the tray as the tray moves forward in the casing. As the tray moves forward, the lug $c^{11}$ is raised, whereupon the lug $c^3$ is lowered and the lug $c^{10}$ elevated. On the forward end of the cam is formed an outwardly projecting inverting lug $d^2$ that is curved upward and toward the front of the casing. This lug $d^2$ is engaged by the lug $c^3$. Immediately upon engagement of the lug $c^3$ and the inverting lug $d^2$, the lug $c^{11}$ upon the bottom of the tray reaches the upper end of the tilting lug $d'$, whereby the movement of the tray is controlled by the contact of the lug $c^3$ upon the inverting lug $d^2$ and by the movement of the chain $a^{10}$. As the chain $a^{10}$ moves forward, the lug $c^3$ remains practically stationary in relation to the inverting lug $d^2$, and therefore the forward movement of the chain tending to turn the tray about the point of contact between lugs $c^3$ and $d^2$ causes the tray to be inverted. As the tray moves forward the lug $c^3$ continues to ride on the lug $d^2$ until the contact is broken between these two lugs whereupon the tray again assumes its normal position. When the tray is inverted it discharges the individual lumps of dough in the several tray compartments into a holder D' having a series of individual discharge compartments $d^3$. These discharge compartments are formed adjacent one another and over the discharge belt $d^4$. The rear wall of the holder D' is inclined upwardly and at its upper end it is mounted upon a sleeve $d^5$ pivotally mounted upon a transverse shaft $d^6$. The sleeve $d^5$ has link $d^7$ extending therefrom and pivotally attached to the link is a reciprocating roller arm $d^8$, one end of which is movably supported by a slotted bracket $d^9$ mounted upon the casing A in any suitable manner. A pin $d^{11}$ extending from arm $d^8$ extends into the slot in bracket $d^9$ and has mounted upon it a roller $d^{12}$ that engages the walls of the slot in arm $d^9$. A roller $d^{10}$ is mounted on the roller arm $d^8$ and this roller engages cam $d^{11}$ mounted upon the shaft $d^9$. The cam $d^{11}$ has a notch $d^{12}$ formed in its outer edge, which edge is engaged by the roller $d^{10}$. The shaft $d^9$ is driven by means of a gear $d^{13}$ engaging the gear $d^{60}$ mounted on the shaft $d^{21}$ having mounted on it the bevel gear $d^{12}$ which engages the gear $d^{14}$ mounted on the vertical shaft $a^8$. In the normal or elevated position of the holder the dough discharged into the discharge compartments is retained in such compartments. The discharge of the dough from the tray compartments is effected in a new and novel manner. As the tray C moves beyond the second position of the tray, as shown in Fig. 8, the lumps of dough move along the bottom of the tray compartments and are moved on to the sleeve $d^5$. At the time that the dough is moved onto the sleeve $d^5$, the holder, and therefore the discharge compartments, are lowered and are in their discharging positions. As the sleeve $d^5$ turns because of the holder $d$ being raised by the action of the cam $d^{11}$ and roller $d^{10}$, the cross bar $c^2$ extending between the lugs $c^3$ on the tray C is moved forward and pushes the lumps of dough off of the sleeve $d^5$ into the discharge compartments. The clearance between the cross bar $c^2$ and the sleeve $d^5$ must be such that this action results. If too little clearance is given, the dough is pinched by the relative movements of the tray and sleeve and the skin of the lump is broken and some of the dough will stick to the canvas on the sleeve. If too much clearance is allowed, the dough will be moved backward below the cross bar $b^2$ as the sleeve is rotated to raise the discharge compartments. When the roller $d^{10}$ registers with the notch $d^{12}$ in the cam $d^{11}$, the weight of the dough and the weight of the holder causes the roller to enter the notch $d^{12}$ whereby the sleeve $d^5$ shown in Fig. 8 will move in a counter-clock-wise direction whereupon by the tilting of the holder the dough is discharged upon the belt $d^4$. To avoid premature discharge of the dough from the compartments $d^3$, an inclined plate $d^{15}$ is mounted adjacent the forward end or mouth of the compartments, the lower edge of the plate terminating immediately adjacent the bottom of the mouth of the compartments $d^3$. A suitable covering, preferably canvas $d^{16}$, is placed over the inner surface of the compartments and extends about the sleeve $d^5$. The movement of the trays, the holder D' and the discharge belt $d^4$ bear such relation that the compartments will be emptied every time that a tray has discharged its dough into the compartments, and so that all the dough that has been discharged upon the belt $d^4$ has been carried from below the compartments by the time the compartments are again discharged. The belt $d^4$ is moved by means of rollers $d^{17}$ and $d^{18}$ mounted upon shafts $d^{19}$ and $d^{20}$ respectively, supported between the brackets $d^{39}$ mounted on casing A. The shaft $d^{20}$ has mounted upon it a beveled gear $d^{21}$ which engages a beveled gear $d^{22}$ mounted upon the vertical shaft $a^8$. A shaft $d^{23}$ supported by brackets $d^{34}$ and having a gear wheel $d^{24}$ mounted thereon engaging the beveled gear $d^{25}$ mounted on vertical shaft $a^8$ is mounted on the casing subjacent to the shaft $d^{20}$. A roller $d^{26}$ is mounted on the shaft $d^{23}$ and about such roller extends an endless separator or spacer belt $d^{27}$ which also extends about the roller $d^{28}$ mounted on the shaft $d^{29}$ and held in position by means of the bracket $d^{30}$ mounted on the support $d^{31}$ having the block $d^{32}$ mounted thereon and thru which block extends the adjustable screw $d^{33}$ adapted to engage the bracket $d^{34}$ supporting the shaft $d^{29}$, whereby the spacer belt $d^{27}$ may be tensioned. The support $d^{31}$ is held in position and adjusted at various angles to the casing A, by means of a yoke $d^{35}$ which is pivotally attached to the support $d^{31}$ and has extending therefrom the rod $d^{36}$ the upper end of which is screw threaded and has mounted upon it an adjustable nut $d^{37}$. The threaded end of the rod $d^{36}$ extends thru a slotted bracket $d^{38}$ mounted on the casing A and the nut $d^{37}$ serves as an abutment engaging the bracket $d^{38}$ and determining the position of the support $d^{31}$ and consequently that of the belt $d^{27}$. The discharge belt $d^4$ over-hangs the spacer belt $d^{27}$. The belt $d^{27}$ is moved faster than is the belt $d^4$. These comparative speeds are determined by the comparative sizes of the beveled gears $d^{21}$ and $d^{24}$.

The operation of my device is as follows:

The lumps of dough F coming from the baller, a mechanism used to form the dough into spherical masses, is deposited upon the belt $b$, the cups $b^{12}$ receiving the individual balls of dough and preventing these balls of dough being fed to the prover in too close a relation. The balling devices E ordinarily have a discharge chute or nozzle E' and the belt $b$ is adjusted in such position below this discharge nozzle of the balling device that there is a very small clearance between the top of cups $b^{12}$ and the end of the discharge nozzle on the baller as the cups are moved past such discharge nozzle. The cup is made of such height that it can pick up the largest lump of dough on the belt and yet small enough that the space lift between belt $b^2$ and nozzle E will prevent a lump of dough passing downward between the nozzle and the belt. The belt $b$ is inclined. When the lump of dough falls from the discharge nozzle E' of the baller, the lump of dough cannot roll down the inclined belt $b$ because of the discharge nozzle on the baller, and the lump of dough cannot travel up the belt $b$ because of the belt's inclination. When a cup $b^{12}$ comes along, the cup carries the lump of dough from the mouth of the baller. If it should happen that there were two lumps of dough ready to be carried away by the belt $b$, the first lump that is engaging belt $b$ will hold the second lump inside the baller discharge nozzle until a cup carried such first lump up the belt whereupon the second lump would fall from the baller nozzle upon the belt $b$. The second lump would stay on the belt adjacent the mouth of the baller nozzle until the next cup carried it away. In this way it is possible to properly space the lumps of dough entering the proofer. The cross bar $b^{11}$ is attached to the chain $b^9$ and to belt $b$ to assure a constant relation between the belt and the chain, therefore the relation of the cups $b^{12}$ and the pockets in the drum $b^{21}$ into which the dough is discharged will remain constant because the belt $b$ is driven from shaft $b^{20}$, by the chain $b^{24}$. When the cups carrying the dough reach a position above the drum $b^{21}$ the dough falls from cups $b^{12}$ into one of the pockets in the drum. As the drum revolves the dough is discharged from the drum into the carriers $b^{40}$. The movement of the cups $b^{12}$ and the drum $b^{21}$ and the carriers $b^{40}$ bear such a relation that individual balls or lumps of dough will be deposited in each carrier as it passes below the drum. The plate $b^{28}$, mounted adjacent the drum, prevents the premature discharge of the dough from the pockets of the drum and assures the deposit of dough in the center of the carriers. At the time that the dough is discharged from the drum the carrier receiving the dough from the drum is supported by the support rod $b^{57}$, and immediately thereafter the carrier is moved upon the rod $b^{41}$. When the carriers reach determined places above the chutes $b^{45}$, the bar $b^{41}$ is moved downward by means of the cam $b^{55}$ and the mechanisms controlled thereby, whereupon the dough is discharged from the carriers into the chutes $b^{45}$, and from the chutes into the compartments $c$ of the trays C. As soon as the carriers have discharged, the rod $b^{41}$ is raised and the empty carriers move around the disks $b^{58}$ and $b^{59}$ and bar $b^{42}$ while the loaded carriers move onto the rod $b^{41}$. All these mechanisms are so controlled relatively so as to assure proper cooperation. The trays are supported by the tray guide $a^{37}$ at the time the dough is deposited therein. The trays are then moved along the supports $a^{30}$ during which time the dough is undergoing the proving process. The heat developed by the fermentation within the dough provides a sufficiently high temperature within the casing as to make further heating thereof unnecessary. This is possible primarily because of the compactness of the device. The compactness of the device is made possible by mounting the sprocket wheels $a^{27}$ upon the stud shaft $a^{29}$ and thereby eliminating the shafts that would otherwise extend across the casing. As the tray is moved toward the highest level of the chains $a^{10}$, they approach the bar $a^{42}$ which projects outward over the lugs $c^3$, $c^4$ and $c^{10}$ on the trays C and assures the trays assuming such position that the referred to lugs will be in horizontal alignment as the trays move toward the discharge mechanism D. The lug $c^{11}$ on the tray abuts the lug $d'$ on the cam $d$ thereby raising the lug $c^{11}$ and causing the lug $c^3$ to engage the lug $d^2$ on the cam $d$. This contact of the lugs $c^3$ and $d^2$ causes the tray to be inverted by the continued movement of the chains $a^{10}$ whereupon the dough is discharged from the trays C into the compartments $d^3$ as previously explained. Immediately after the discharge of the dough into the compartments $d^3$, the dough is discharged from the compartments $d^3$ upon the belt $d^4$ by the registration of the roller $d^{10}$ with notch $d^{11}$ and the consequent dropping of the holder. The plate $d^{15}$ prevents premature discharge of the dough from the holder should any of the dough in the tray compartments discharge more quickly than other balls of dough in other tray compartments. The tray then moves to a position below the flour box $a^{31}$ which is then actuated by means of the cam $a^{32}$ and the rod $a^{35}$ whereupon a film of flour is spread over the interior of the tray. The tray then moves downward toward the guide $a^{37}$ to receive more dough. After the dough has been discharged upon the belt $d^4$ it is carried out of the proofing chamber by means of the belt $d^4$ and is deposited upon the belt $d^{27}$. The belt $d^4$ is actuated at such rate of speed that the last of the balls of dough have just passed from below the holder when the holder again discharges. The spacer belt $d^{27}$ is moved fast in comparison with the discharge belt $d^4$, therefore the balls of dough falling individually from the belt $d^4$ upon the belt $d^{27}$ are separated from one another to a considerable distance and therefore when these balls of dough discharge from the belt $d^{27}$ into a moulder, which is the next machine in the process of bread baking, there will be no danger of several balls of dough being moulded into one loaf and consequently avoiding the formation of doubles. All the mechanisms are operated from the shaft $a^6$, therefore when the various parts of the device have been adjusted to their proper cooperative working relation they will retain such proper cooperating relation at all times. The shaft $a^6$ may have power transmitted to it from any suitable source, and the speed of shaft $a^6$ may be so regulated or modified as to give the desired period of proving to the dough.

What I claim is:

1. In an automatic proofer the combination of a casing having a proofing chamber within it, endless chains mounted movably upon opposite sides of the casing, trays mounted on the chains, a loading device comprising cups adapted to carry lumps of dough, a drum having a pocket adapted to register with the cups, an endless chain mounted within the casing transversely thereof, a series of carriers having their one end pivotally mounted upon the transverse chain and adapted to register with the pocket in the drum, a bar normally holding the other end of a series of carriers in a normally elevated position, a series of chutes having their upper ends disposed below the carriers, means adapted to lower the bar when a carrier registers with each chute, the chains mounted on the sides of the casing being adapted to carry the trays into registration with the bottoms of the chutes simultaneously with the lowering of the bar.

2. In an automatic proofer the combination of a casing, stud shafts mounted on the sides of the casing, sprocket wheels mounted upon the stud shafts, tray guides mounted on the casing in vertical alignment with certain of the sprocket wheels, endless chains mounted on opposite sides of the casing and extending about the sprocket wheels and extending thru the tray guides, a series of trays mounted upon the chains and extending transversely thru the casing, lugs on the trays adapted to engage the tray guide, a series of fixed chutes adapted to discharge into the trays while the lugs on the trays engage the tray guide, a series of carriers adapted to be moved to positions above the chutes, means to discharge the carriers into the chutes and means to deposit lumps of dough in the carriers.

3. In a proofer the combination with trays, of a tray loading device comprising a belt extending from the proofer, a revoluble drum mounted upon the proofer and disposed below the inner end of the belt, pockets in the drum, carriers adapted to be moved below the drum and into which the pockets in the drum discharge, means to discharge the carriers into a tray, and means to revolve the drum.

4. In a proofer the combination with trays, of a tray loading device comprising a belt extending from the proofer, a drum mounted revolubly upon the proofer and disposed below the inner end of the belt, pockets in the drum, a plate mounted adjacent the drum adapted to prevent premature discharge of the drum, carriers adapted to be moved adjacent the drum and into which the drum pockets are adapted to discharge, and means to discharge the carriers into a tray.

5. In a proofer a dough spacing device comprising a discharge nozzle, an inclined belt having an upper face moving upwardly and receiving lumps of dough from the nozzle, means to mount the belt on the proofer, and a series of cups mounted on the belt, the discharge nozzle, the belt and the cups being adapted to space the lumps of dough fed into the proofer, and means to actuate the belt in cooperative unison with the proofer actuating mechanisms.

6. In an automatic proofer a dough spacing device comprising a discharge nozzle, a support mounted upon the proofer at an angle thereto, rollers mounted upon the support at the opposite ends thereof, sprocket wheels mounted adjacent the rollers and adapted to revolve therewith, endless chains mounted on the sprocket wheels, an upwardly moving belt mounted on the rollers passing below the discharge nozzle, a cross bar mounted on the chains and affixed to the belt, cups mounted on the chains adapted to contact the belt whereby the belt and cups form pockets for receiving lumps of dough from the discharge nozzle, the cups, the nozzle, and the inclination of the belt bearing a relation such as to preclude more than one lump of dough being received from the nozzle at one time, and means to actuate the sprocket wheels in cooperative unison with the proofer actuating mechanisms.

7. A tray loading device comprising a belt adapted to carry lumps of dough, a revoluble drum having a pocket adapted to register with the end of the belt, a series of carriers adapted to register with the pocket in the drum, means to actuate the drum so that the pocket therein registers alternately with the belt and a carrier, and means to simultaneously discharge a series of carriers into one tray.

8. A tray loading device for trays having a series of compartments comprising a discharge nozzle, an inclined belt adapted to receive lumps of dough from the nozzle, cups mounted on the belt adapted to support lumps of dough, the nozzle, the cups, and belt bearing relation such as to preclude more than one lump of dough being received from the nozzle at one time, carriers, means to transfer the lumps of dough from the cups to the carriers, and means to simultaneously discharge a series of carriers into individual tray compartments.

9. In a proofer a tray loading device comprising the combination of parallel horizontal shafts mounted on the proofer, sprocket wheels mounted on the parallel shafts, an endless chain extending about the sprocket wheels, a series of carriers hingedly mounted at their rear upon the endless chain, a reciprocating bar supporting the forward end of a series of trays and normally supporting the trays in a horizontal plane, means to maintain the forward and rear ends of the trays in a constant relation to the endless chains when not in engagement with the reciprocating bar, means to deposit individual lumps of dough into individual carriers and means to actuate the reciprocating bar when a series of a given number of carriers have been subjected to the means for depositing dough in the carriers.

10. In a proofer a tray loading device comprising a series of carriers, means to deposit dough into the carriers, means to move the carriers past the dough depositing means, hinges connecting one end of the carriers to the carrier moving means, a reciprocating bar supporting the other end of the carriers after leaving the dough depositing means, a bracket pivotally mounted on the proofer and supporting the bar, a lever arm mounted pivotally on the proofer, a link pivotally connecting the bracket and the lever arm, a revoluble cam, and a roller arm connected with the lever arm, and engaging the cam.

11. In a proofer a tray loading device comprising a series of carriers, means to deposit dough in the carriers, means to move the carriers past the dough depositing means, hinges connecting one end of the carriers to the carrier moving means, parallel transverse shafts mounted on the proofer, brackets mounted upon one of the transverse shafts, a bar mounted on the brackets and supporting the other end of the carriers, a revoluble cam mounted on the proofer adjacent the second transverse shaft, a roller arm mounted on the second transverse shaft and engaging the cam, a lever arm mounted on the second transverse shaft, and a link pivotally connecting the bracket and the lever arm.

12. In a proofer a tray loading device comprising a series of carriers, means to deposit dough in the carriers, means to move the carriers past the dough depositing means, hinges connecting one end of the carriers to the carrier moving means, parallel transverse shafts mounted on the proofer, brackets mounted upon one of the transverse shafts, a bar mounted on the brackets and supporting the other end of the carriers, a revoluble notched cam mounted on the proofer adjacent the second transverse shaft, a roller arm mounted on the second transverse shaft and engaging the cam, a lever arm mounted on the second transverse shaft, and a link pivotally connecting the bracket and the lever arm.

13. In a proofer the combination of a casing having a proofing chamber within it, sprocket wheels mounted on the sides of the casing, endless chains engaging the sprocket wheels and at the rear of the chamber passing in a horizontal line from one sprocket wheel to the next wheel in sequence and at the forward end of the chamber passing in a vertical line from one sprocket wheel to the next wheel in sequence, trays supported between the chains, and a tray loading device and a tray discharging device disposed between the horizontally and vertically extending portions of the chain.

14. In a proofer the combination of a casing having a proofing chamber within it, endless chains mounted movably upon the sides of the proofing chamber, means to move the chains, trays supported between the chains, the chains moving horizontally at the rear of the chamber, and vertically at the front of the chamber whereby a space untraversed by the chains is provided near the forward end of the chamber intermediate the horizontal and vertical moving chain sections, and a tray loading device and a tray discharging device disposed in the untraversed space.

15. In a proofer the combination of a casing, trays mounted within the casing transversely thereof, means to impart continuous movement to the trays, a transversely moving belt, uniform tiltable carriers each pivotally mounted on the belt, unitary means for simultaneously tilting a series of carriers intermittingly so as to discharge the series of carriers into a tray, and means for feeding dough into the carriers.

16. A proofer a tray loading device comprising parallel shafts, sprocket wheels mounted on the shafts, a disk adjacent one shaft, an endless chain mounted on the sprocket wheels, carriers mounted pivotally upon the chain, oscillating means normally supporting the one end of the carriers in the same plane with the opposite end thereof, the disk being adapted to cooperate with the oscillating means to return the carriers to their normal positions.

17. A proofer tray loading device comprising parallel shafts, sprocket wheels adjacent the shafts, disks mounted on the shafts, an endless chain mounted on the sprocket wheels, carriers mounted pivotally upon the endless chain and adapted to pass around the disks, a support rod adapted to support the carriers in normally upright position, an oscillating bar adapted normally to support the carriers in their normally upright positions, a fixed bar adapted to maintain the carriers in engagement with the disks when moving from and toward their normally upright positions and to support the carriers when in an inverted position.

18. In a tray loading device the combination of a casing, transverse trays in the casing, means to impart continuous movement to the trays, a transversely moving belt, carriers each having an end hingedly mounted on the belt and tiltable at an angle substantially perpendicular to the line of movement of the belt, means for intermittingly tilting a series of carriers at one time, the tilted carriers discharging into the trays, and means for feeding dough to the carriers.

19. In a tray loading device the combination of an endless moving belt, carriers mounted hingedly on the belt for tilting transversely of the line of movement of the belt, means for depositing articles upon the carriers, and unitary means for tilting the carriers for discharging articles from the carriers.

20. In a device of the class described the combination of an endless chain extending in part in a horizontal plane, a support for the horizontally extending portion of the chain, trays hingedly supported by the chain, a bracket mounted for oscillation and for supporting the trays, and means for oscillating the bracket.

21. In a tray loading device the combination of a horizontal moving belt, carriers mounted for hinged movement on the belt about axes extending in the line of movement of the belt, means for depositing articles on the carriers, means for moving the carriers about their axes for discharging the carriers, chutes having their upper ends disposed adjacent the carriers and into which upper ends the carriers discharge, trays, and means for presenting trays to the lower ends of the chutes for receiving articles discharged into the chutes.

22. In a tray loading device the combination of an endless moving belt, carriers hingedly mounted on the belt, a bar for slidably engaging a series of carriers and for holding the carriers against movement on their hinged mountings, means for depositing articles in the carriers, and means for moving the bar for moving the carriers about their hinged mountings on the belt.

23. In a tray loading device the combination of a moving belt, carriers hingedly mounted on the belt, means for depositing articles in the carriers, a plurality of chutes disposed adjacent the belt, an oscillating bar for supporting a series of the carriers and over which bar the carriers are moved by the belt, means for actuating the bar for moving the carriers about their hinged mountings on the belt for discharging the carriers, one each of a series into one each of the chutes, and means for presenting a tray to the chutes for receiving the articles from the chutes.

In testimony whereof, I have hereunto subscribed my name this 13th day of January, 1921.

SIGMUND SCHIFF.